United States Patent
Suzuki et al.

(10) Patent No.: US 11,501,364 B2
(45) Date of Patent: Nov. 15, 2022

(54) INFORMATION PROCESSING APPARATUS, INFORMATION PROCESSING SYSTEM, INFORMATION PROCESSING METHOD, AND VEHICLE

(71) Applicants: TOYOTA JIDOSHA KABUSHIKI KAISHA, Toyota (JP); DENSO CORPORATION, Kariya (JP)

(72) Inventors: Yukari Suzuki, Setagaya-ku (JP); Naoki Yamada, Toyota (JP); Toshihiro Arai, Nagoya (JP); Kuniaki Jinnai, Nagoya (JP); Keiichi Uno, Chita-gun (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 9 days.

(21) Appl. No.: 16/943,011

(22) Filed: Jul. 30, 2020

(65) Prior Publication Data
US 2021/0035198 A1    Feb. 4, 2021

(30) Foreign Application Priority Data

Jul. 30, 2019   (JP) .............................. JP2019-140206

(51) Int. Cl.
*G06Q 30/00*   (2012.01)
*G06Q 30/06*   (2012.01)

(52) U.S. Cl.
CPC .............................. *G06Q 30/0643* (2013.01)

(58) Field of Classification Search
None
See application file for complete search history.

(56) References Cited

U.S. PATENT DOCUMENTS 11,023,957 B1 *   6/2021   Montague ............ G06Q 20/204
2017/0287060 A1 *   10/2017   Choi ....................... G06T 13/40
(Continued)

FOREIGN PATENT DOCUMENTS

JP    2003122967 A    4/2003
JP    2007-011543 A    1/2007
(Continued)

OTHER PUBLICATIONS

Gross, H., Toomas: Interactive Shopping Guide robots in everyday use—final implementation and experiences from long-term field trials, Oct. 1, 2009, 2009 IEEE/RSJ International Conference on Intelligible Robots and Systems, pp. 2005-2012 (Year: 2009).*

*Primary Examiner* — Jeffrey A. Smith
*Assistant Examiner* — Timothy J Kang
(74) *Attorney, Agent, or Firm* — Oblon, McClelland, Maier & Neustadt, L.L.P.

(57) ABSTRACT

A user can easily grasp a state of wearing clothing, and information regarding coordination corresponding to the clothing is provided to the user. An information processing apparatus according to the present disclosure includes a communication interface that performs communication with an information providing apparatus that provides coordination information regarding coordination of clothing, and a controller that displays, using a display apparatus mounted on a vehicle, an image of a state in which a user is virtually wearing clothing. The controller transmits the image to the information providing apparatus and receives coordination information, provided by the information providing apparatus, corresponding to the image, via the communication interface, and informs the user of the coordination information received.

9 Claims, 4 Drawing Sheets

(56) References Cited

U.S. PATENT DOCUMENTS

2019/0205966 A1\* 7/2019 Igata ................ H04W 4/029
2020/0050206 A1\* 2/2020 Deyle ................ G01S 13/74

FOREIGN PATENT DOCUMENTS

JP       2011221984 A    11/2011
JP       2019121086 A    7/2019

\* cited by examiner

INFORMATION PROCESSING APPARATUS, INFORMATION PROCESSING SYSTEM, INFORMATION PROCESSING METHOD, AND VEHICLE

CROSS-REFERENCE TO RELATED APPLICATION

The present application claims priority from Japanese patent application No. 2019-140206, filed on Jul. 30, 2019, the entire content of which is incorporated herein by reference.

TECHNICAL FIELD

The present disclosure relates to an information processing apparatus, an information processing system, an information processing method, and a vehicle.

BACKGROUND

As an example, JP 2007-011543 A (PTL 1) describes a method of simulating the wearing of clothing by a user. Specifically, in PTL 1 the shape of clothing in product image information representing the appearance of the clothing is transformed in conformity with the body shape of a user, product image information for the deformed product shape is superimposed on body image information representing the appearance of the user's body, and the resulting image is displayed as a simulation result.

CITATION LIST

Patent Literature

PTL 1: JP 2007-011543 A

SUMMARY

In recent years, mail-order sales over the Internet using websites or the like have been widely used. In cases in which clothing is purchased through mail-order, because a user cannot actually wear (fit) the clothing that the user is considering for purchase, it is difficult for the user to imagine a state in which the user is wearing the clothing.

By using the technology described in PTL 1, the result of simulating a state in which the clothing that the user is considering for purchase is being worn can be obtained even in the case of mail-order sales. Therefore, the user can easily imagine the state in which the clothing that the user is considering for purchase is being worn, and decide whether to purchase.

In general, when a user purchases clothing or the like, the user seeks the advice of a professional (coordinator) regarding the coordination of the clothing. The art described in PTL 1 does not sufficiently take into account such a demand.

In view of the problem described above, an object of the present disclosure is to provide an information processing apparatus, an information processing system, an information processing method, and a vehicle, that enable a user to easily grasp a state in which clothing is being worn, and are capable of providing the user with information regarding coordination of the clothing.

An information processing apparatus according to an embodiment of the present disclosure includes a communication interface configured to perform communication with an information providing apparatus that provides coordination information that is information regarding coordination of clothing, and a controller configured to display, using a display apparatus mounted on a vehicle, an image of a state in which a user is virtually wearing clothing.

The controller is configured to transmit the image to the information providing apparatus and receive coordination information, provided by the information providing apparatus, corresponding to the image, via the communication interface, and notify the user of the coordination information received.

An information processing system according to an embodiment of the present disclosure includes an information providing apparatus configured to provide coordination information regarding coordination of clothing, an information processing apparatus communicable with the information providing apparatus, and a vehicle including a display apparatus.

The information processing apparatus is configured to displays, using the display apparatus, an image of a state in which a user is virtually wearing clothing, and transmit the image to the information providing apparatus, receive coordination information, provided by the information providing apparatus, corresponding to the image, and notify the user of the coordination information received.

An information processing method according to an embodiment of the present disclosure is an information processing method to be performed by an information processing apparatus communicable with an information providing apparatus that provides coordination information regarding coordination of clothing.

The method includes displaying, by a display apparatus mounted on a vehicle, an image of a state in which a user is virtually wearing clothing, and transmitting the image to the information providing apparatus, receiving coordination information, provided by the information providing apparatus, corresponding to the image, and notifying the user of the coordination information received.

A vehicle according to an embodiment of the present disclosure is a vehicle including a display apparatus and an information processing apparatus.

The information processing apparatus includes a communication interface configured to perform communication with an information providing apparatus that provides coordination information regarding coordination of clothing, and a controller configured to display, using the display apparatus, an image of a state in which a user is virtually wearing clothing.

The controller is configured to transmit the image to the information providing apparatus and receive coordination information, provided by the information providing apparatus, corresponding to the image, via the communication interface, and notify the user of the coordination information received.

According to an embodiment of the present disclosure, a user can easily grasp a state in which the clothing is being worn, and information regarding coordination corresponding to the clothing can be provided to the user.

DETAILED DESCRIPTION

Figure 1:
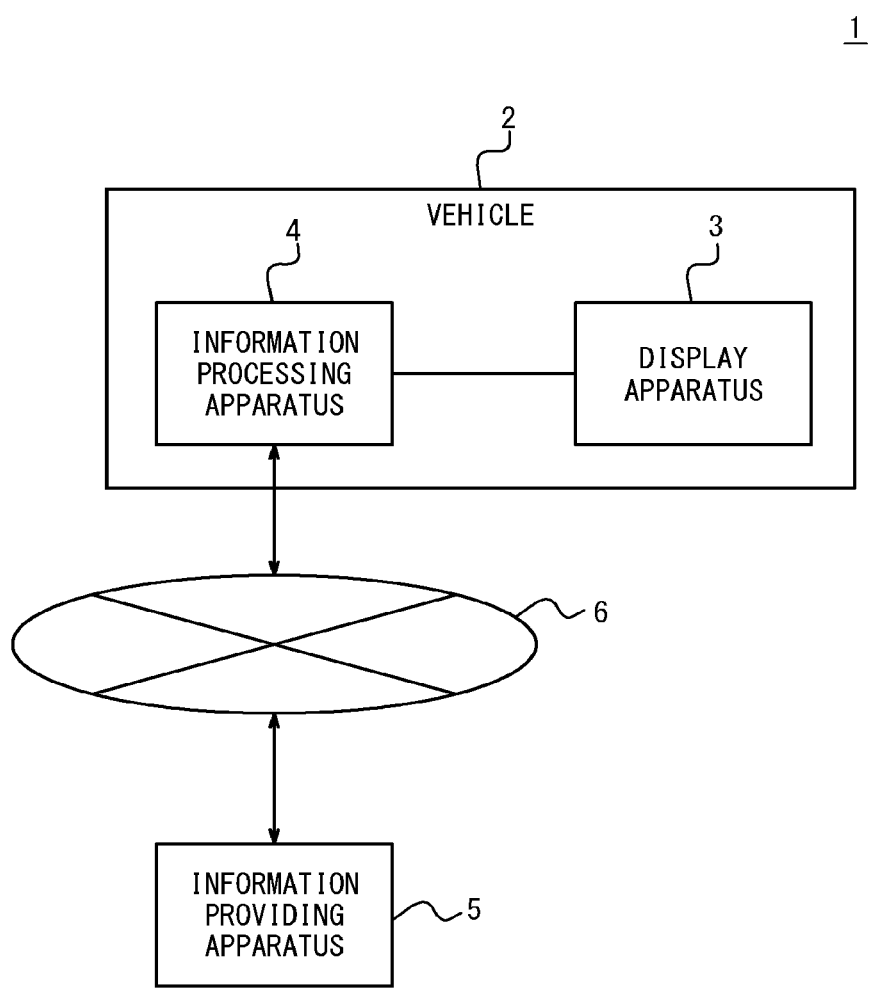
FIG. 1 illustrates an exemplary configuration of an information processing system according to an embodiment of the present disclosure.

Hereinafter, an embodiment of the present disclosure will be described with reference to the drawings. In the drawings, the same reference numerals denote the same or similar constituent elements.

FIG. 1 illustrates an exemplary configuration of an information processing system 1 according to an embodiment of the present disclosure. The information processing system 1 according to the present embodiment includes a vehicle 2, an information processing apparatus 4, and an information providing apparatus 5. The information processing apparatus 4 is mounted on the vehicle 2. The information processing apparatus 4 mounted on the vehicle 2 and the information providing apparatus 5 are communicably connected with a network 6, which may include a mobile communication network and the Internet, for example.

A display apparatus 3 is also mounted on the vehicle 2. That is, the vehicle 2 includes the display apparatus 3 and the information processing apparatus 4. The information providing apparatus 5 provides coordination information that is information regarding coordination of clothing.

First, an outline of the present embodiment will be described, with a detailed description to follow. In the information processing apparatus 4, an image of a state in which a user is virtually wearing clothing is displayed by the display apparatus 3. The information processing apparatus 4 transmits the image to the information providing apparatus 5, and provides the user with coordination information corresponding to the image, provided by the information providing apparatus 5.

With such a configuration, because an image of a state in which the user is virtually wearing the clothing is displayed on the display apparatus 3, the user can easily grasp the state in which the clothing is being worn. Moreover, it is also possible to notify and provide the user with coordination information provided by the information providing apparatus 5 corresponding to the image.

Next, each configuration of the information processing system 1 will be described in detail.

The vehicle 2 is a vehicle to be used for mobile sale of clothing, for example. As described above, the vehicle 2 includes the display apparatus 3 and the information processing apparatus 4.

The vehicle 2 may also include an automated driving function to perform vehicle control automatically on the basis of control information from an external source. In the present embodiment, "automated driving" includes cases in which some or all of the user operations for driving a vehicle are automated. For example, automated driving may include levels 1 to 5 as defined by the Society of Automotive Engineers (SAE). The vehicle 2 may also include an on-vehicle communication device, for example, and may be connected to the network 6 via the on-vehicle communication device. At least part of an Application Programming Interface (API) defining the specifications of control information is disclosed to service providers that provide services using vehicles having the automated driving function. Service providers can use the disclosed API to freely program automated driving control software. Therefore, by installing facilities corresponding to a particular purpose in the in-vehicle space of a vehicle having an automated driving function and by programming automated driving control software using the API corresponding to the object, service providers are able to provide any mobility service (for example, the coordination information providing service according to the present embodiment).

The display apparatus 3 includes any display device. For example, the display apparatus 3 includes a display device (for example, a liquid crystal panel) capable of displaying a life-sized image of a user. The display apparatus 3 may be provided inside the vehicle 2 or on the outer surface of the vehicle 2.

The information providing apparatus 5 outputs coordination information corresponding to, for example, an input from a professional who coordinates clothing (coordinator). Coordination information includes information such as an evaluation result for coordination of the user's clothing in an image transmitted from the information processing apparatus 4, and a recommended coordination matching the clothing virtually worn by the user in the image. The information providing apparatus 5 may output information for a recommended coordination to a user on the basis of information such as the physical characteristics of the user, the clothing previously selected by the user, the clothing recommended by the manufacturer or seller of the clothing, or data regarding the user's tastes.

The information processing apparatus 4 displays an image of a state in which a user is virtually wearing clothing on the display apparatus 3, acquires coordination information corresponding to the image from the information providing apparatus 5, and notifies the user of the acquired coordination information.

Figure 2:
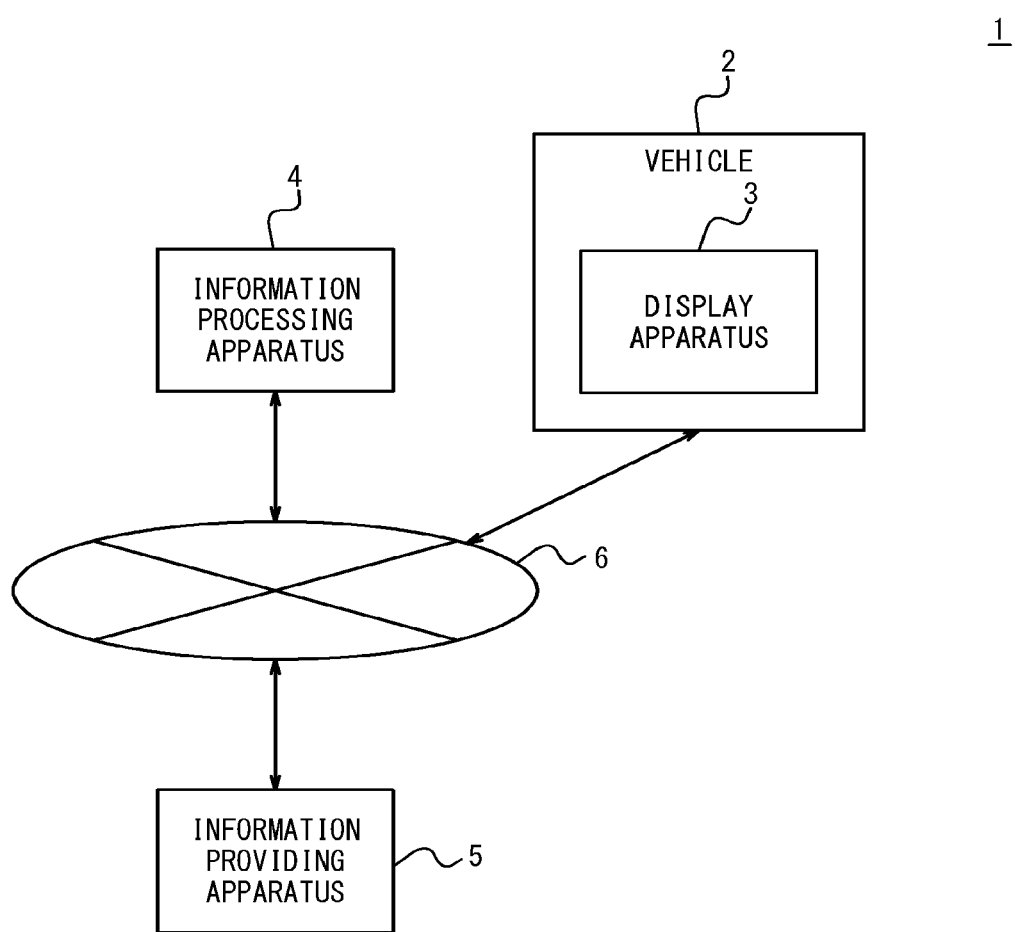
FIG. 2 illustrates another exemplary configuration of the information processing system according to an embodiment of the present disclosure.

Note that in FIG. 1, an example in which the information processing apparatus 4 is mounted on the vehicle 2 has been described. However, the present disclosure is not limited thereto. For example, as illustrated in FIG. 2, the information processing apparatus 4 may be provided as a server apparatus communicable with the vehicle 2 and the information providing apparatus 5 over the network 6. In that case, the information processing apparatus 4 is communicable with the display apparatus 3 via the network 6 and an on-vehicle communication device mounted on the vehicle 2.

Next, the configuration of the information processing apparatus 4 will be described. As the display apparatus 3 is a typical display device, description of the configuration thereof is omitted. Any apparatus may be used as the information providing apparatus 5, providing that it is an apparatus (for example, personal computer (PC), a tablet terminal, or the like) having a function for performing communication over the network 6, a function for displaying an image transmitted from the information processing apparatus 4, and a function for receiving input of coordination information from a coordinator. Since the configuration of such an apparatus is well known, the description thereof is omitted.

Figure 3:
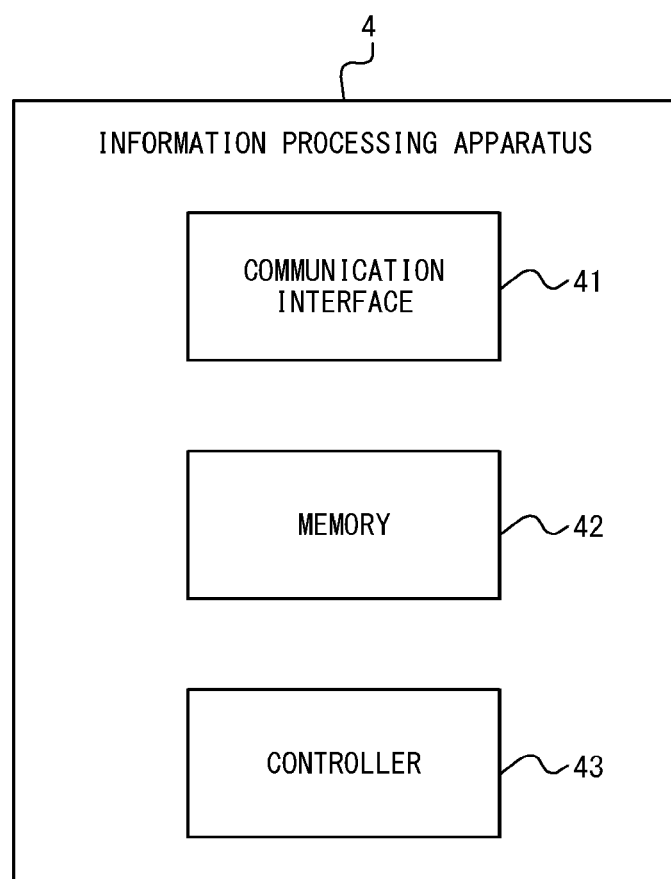
FIG. 3 illustrates an exemplary configuration of an information processing apparatus illustrated in FIGS. 1 and 2.

FIG. 3 illustrates an exemplary configuration of the information processing apparatus 4.

As illustrated in FIG. 3, the information processing apparatus 4 includes a communication interface 41, a memory 42, and a controller 43.

The communication interface 41 includes one or more communication modules that connect to the network 6. The communication module supports mobile communication standards such as the 4th Generation (4G) and 5th generation (5G) standard, the wired Local-Area Network (LAN) standards or the wireless LAN standards, and the like, for example. However, it is not limited thereto. The communication module may support any communication standards. In the present embodiment, the information processing apparatus 4 is connected to the network 6 via the communication interface 41. As illustrated in FIG. 1, when the information processing apparatus 4 is mounted on the vehicle 2, the communication interface 41 may be an on-vehicle communication device such as a DCM mounted on the vehicle 2.

The memory 42 may include, for example, a main memory, an auxiliary memory, a cache memory, or the like, but is not limited thereto. The memory 42 stores any information to be used for operation of the information processing apparatus 4. For example, the memory 42 may store a system program, an application program, a database, and the like. The information stored in the memory 42 can be updated with information acquired from the network 6 via the communication interface 41, for example. The memory 42 may store information related to the clothing virtually worn by the user in the past, images of a state in which the clothing is virtually worn, and coordination information provided to the user in the past, and the like.

The controller 43 includes one or more processors. In the present embodiment, the "processor" may be a general-purpose processor, or a processor dedicated to specific processing, but is not limited thereto. The controller 43 controls the entire operation of the information processing apparatus 4. The details of the operation of the information processing apparatus 4 controlled by the controller 43 will be described below.

Figure 4:
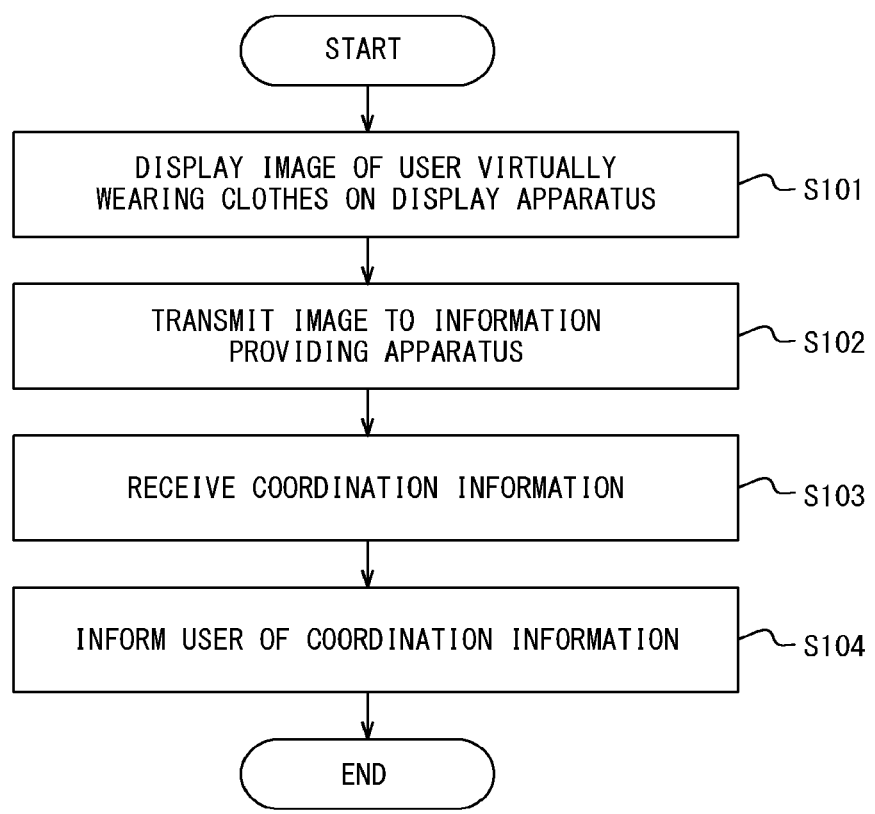
FIG. 4 is an illustration for explaining an information processing method in the information processing apparatus illustrated in FIGS. 1 and 2.

FIG. 4 is a flowchart for explaining an information processing method performed by the information processing apparatus 4 according to the present embodiment, illustrating exemplary operations of the information processing apparatus 4.

The controller 43 causes the display apparatus 3 to display an image of a state in which a user is virtually wearing clothing (for example, clothing selected by the user) (step S101). For example, the controller 43 superimposes an image of clothing on the full-length image of the user captured in advance by an imager to thereby generate an image of a state in which the user is virtually wearing the clothing, and causes the display apparatus 3 to display the image. As illustrated in FIG. 2, when the information processing apparatus 4 is provided as a server device, the controller 43 transmits a generated image to the vehicle 2 via the communication interface 41 and the network 6, and allows the display apparatus 3 to display it.

Next, the controller 43 transmits the generated image to the information providing apparatus 5 via the communication interface 41 and the network 6 (step S102). Coordination information such as an evaluation of coordination and a recommended coordination, for example, corresponding to the image transmitted from the information processing apparatus 4, is input to the information providing apparatus 5 by the coordinator. The information providing apparatus 5 transmits the input coordination information to the information processing apparatus 4 over the network 6.

Next, the controller 43 receives the coordination information transmitted from the information providing apparatus 5 via the network 6 and the communication interface 41 (step S103). The controller 43 notifies the user of the received coordination information by displaying it on the display apparatus 3, for example (step S104).

In the present embodiment, the display apparatus 3 is mounted on the vehicle 2, and the present embodiment provides a service for displaying an image of a state in which a user is virtually wearing clothing on the display apparatus 3, and informing the user of coordination information corresponding to the image. Therefore, when the vehicle 2 patrols a plurality of points (patrol points), the service can be provided at various locations.

The controller 43 may notify a terminal apparatus, such as a PC, a smartphone, or a tablet terminal, used by a user, of the schedule of the vehicle 2 patrolling the predetermined patrol points. The notification destination can be registered in advance in the information processing apparatus 4. For example, a user may input information regarding the notification destination (for example, an email address) to a terminal apparatus, the terminal apparatus may transmit the input information to the information processing apparatus 4, and the memory 42 of the information processing apparatus 4 may register the information transmitted from the terminal apparatus in a database. Thereby, for example, it is possible to notify the user who wishes to receive a service from the vehicle 2, of the patrol points of the vehicle 2. This enables the service to be provided more efficiently.

Moreover, position information for the position of the user (for example, position information for the home, position information for the office, or the like) may be registered in the database in the memory 42. In that case, the controller 43 may refer to the database in the memory 42 and notify the patrol points to the terminal apparatus of a user whose registered position information is near (for example, within several hundred meters of) the patrol points of the vehicle. Thereby, patrolling of the vehicle 2 can be notified to a user who is near the patrol points of the vehicle 2, so that it is possible to provide more efficient notice to users having a higher possibility of receiving the service provided by the vehicle 2.

Furthermore, the vehicle 2 may be loaded with clothing that is the same as that virtually worn by the user. Thereby, it is possible to sell clothing that is the same as that virtually worn by the user on site, or deliver them to the user's home after the user has completed the purchase procedure.

As described above, in the information processing system 1 of the present embodiment, the information processing apparatus 4 causes the display apparatus 3 mounted on the vehicle 2 to display an image of a state in which a user is virtually wearing clothing. The information processing apparatus 4 also transmits the image to the information providing apparatus 5 and receives coordination information, provided by the information providing apparatus 5, corresponding to the image, and notifies the user of the received coordination information.

Therefore, for example, since an image of a state in which a user is virtually wearing clothing that the user is considering for purchase is displayed on the display apparatus 3, the user can easily grasp the state in which the clothing is being worn. Moreover, it is also possible to provide the user with coordination information corresponding to the image.

The embodiment described above is provided as a representative example. It will be obvious to those skilled in the art that various changes and replacements can be made within the spirit and the scope of the present disclosure. Therefore, it should be understood that the present disclosure is not limited by the embodiment described above. Various modifications and changes can be made without departing from the scope of the claims. For example, it is possible to combine a plurality of configuration blocks or divide one configuration block in the configuration diagram of the embodiment.

Further, a configuration in which one or more general-purpose information processing apparatuses, such as a smartphone or a computer, function as the information processing apparatus 4 according to the embodiment described above is also possible. Specifically, a program describing the processing contents for realizing each function of the information processing apparatus 4 according to the embodiment may be stored in the memory of the information processing apparatus, and the program may be read by the processor of the information processing apparatus to be executed. Therefore, the disclosure according to the present embodiment can also be realized as a program executable by a processor or a non-transitory computer-readable recording medium on which such a program is recorded.

Furthermore, the network 6 in the present embodiment includes, besides the example described above, an ad-hoc network, Metropolitan Area Network (MAN), cellular network, Wireless Personal Area Network (WPAN), Public Switched Telephone Network (PSTN), Terrestrial Wireless Network, an optical network, or another network, or a combination thereof. Constituent elements of a wireless network include an access point (for example, Wi-Fi access point), a femtocell, and the like, for example. Moreover, a wireless communication device can be connected with WiFi® (WiFi is a registered trademark in Japan, other countries, or both), Bluetooth® (Bluetooth is a registered trademark in Japan, other countries, or both), and a wireless network using a cellular communication technology or other wireless technologies and technical standards.

As described above, various aspects of the present disclosure can be implemented in many different embodiments, and all of which are included in the scope of the present disclosure.

The invention claimed is:

1. An information processing apparatus comprising:
a communication interface configured to perform communication with an information providing apparatus, the information providing apparatus providing coordination information regarding coordination of clothing; and
a controller configured to:
  display, using a display apparatus mounted on a vehicle, an image of a state in which a user is virtually wearing clothing,
  transmit the image to the information providing apparatus and receive coordination information, provided by the information providing apparatus, corresponding to the image, via the communication interface, and notify the user of the coordination information received, and
  notify a terminal apparatus of the user of a schedule of the vehicle that patrols one or more patrol points.

2. The information processing apparatus according to claim 1, wherein
the information processing apparatus is mounted on the vehicle.

3. The information processing apparatus according to claim 1, wherein
position information regarding a position of the user is registered in a database in advance, and
the controller is configured to notify the terminal apparatus of the user of the one or more patrol points, the user being a user for which position information near the one or more patrol points of the vehicle is registered in the database.

4. An information processing system comprising:
an information on providing apparatus configured to provide coordination information regarding coordination of clothing;
an information processing apparatus communicable with the information providing apparatus; and
a vehicle including a display apparatus, wherein
the information processing apparatus is configured to:
  display, using the display apparatus, an image of a state in which a user is virtually wearing clothing,
  transmit the image to the information providing apparatus, receive coordination information, provided by the information providing apparatus, corresponding to the image, and notify the user of the coordination information received, and
  notify a terminal apparatus of the user of a schedule of the vehicle that patrols one or more patrol points.

5. The information processing system according to claim 4, wherein
the information processing apparatus is mounted on the vehicle.

6. The information processing system according to claim 4, wherein
the display apparatus is provided inside the vehicle or on an outer surface of the vehicle.

7. The information processing system according to claim 4, wherein
clothing that is the same as the clothing virtually worn by the user is loaded in the vehicle.

8. An information processing method to be performed by an information processing apparatus communicable with an information providing apparatus, the information providing apparatus providing coordination information regarding coordination of clothing, the method comprising:
displaying, by a display apparatus mounted on a vehicle, an image of a state in which a user is virtually wearing clothing;
transmitting the image to the information providing apparatus, receiving coordination information, provided by the information providing apparatus, corresponding to the image, and notifying the user of the coordination information received; and
notifying a terminal apparatus of the user of a schedule of the vehicle that patrols one or more patrol points.

9. A vehicle comprising:
a display apparatus; and
an information processing apparatus, wherein
the information processing apparatus includes:
a communication interface configured to perform communication with an information providing apparatus, the information providing apparatus providing coordination information regarding coordination of clothing; and
a controller configured to:
  display, using the display apparatus, an image of a state in which a user is virtually wearing clothing,
  transmit the image to the information providing apparatus and receive coordination information, provided by the information providing apparatus, corresponding to the image, via the communication interface, and notify the user of the coordination information received, and notify a terminal apparatus of the user of a schedule of the vehicle that patrols one or more patrol points.

\* \* \* \* \*